US009767323B2

(12) United States Patent
Dolph et al.

(10) Patent No.: US 9,767,323 B2
(45) Date of Patent: Sep. 19, 2017

(54) SPATIAL SECURITY FOR STORED DATA

(71) Applicant: INTERNATIONAL BUSINESS MACHINES CORPORATION, Armonk, NY (US)

(72) Inventors: Blaine H. Dolph, Western Springs, IL (US); Sandeep R. Patil, Elmsford, NY (US); Riyazahamad M. Shiraguppi, Maharashtra (IN); Gandhi Sivakumar, Victoria (AU); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 13/833,497

(22) Filed: Mar. 15, 2013

(65) Prior Publication Data

US 2014/0283111 A1    Sep. 18, 2014

(51) Int. Cl.
*G06F 21/80* (2013.01)
*G06F 21/62* (2013.01)

(52) U.S. Cl.
CPC .......... *G06F 21/80* (2013.01); *G06F 21/6218* (2013.01)

(58) Field of Classification Search
CPC .. G06F 21/60; G06F 2221/2111; G06F 21/80; G06F 21/6218
See application file for complete search history.

(56) References Cited

U.S. PATENT DOCUMENTS

| 6,614,750 | B2  |    | 9/2003  | Weber et al. |
|-----------|-----|----|---------|--------------|
| 6,978,023 | B2  | *  | 12/2005 | Dacosta ......................... 380/258 |
| 7,543,117 | B1  | *  | 6/2009  | Hanan ............................ 711/154 |
| 7,613,921 | B2  |    | 11/2009 | Scaralata |
| 7,978,090 | B2  | *  | 7/2011  | Brooks .................. G08B 13/10 |
|           |     |    |         | 323/904 |
| 2003/0105972 | A1 |   | 6/2003  | Teng |
| 2004/0153671 | A1 |   | 8/2004  | Schuyler et al. |
| 2007/0023508 | A1 | * | 2/2007  | Brookner ....................... 235/382 |
| 2010/0112942 | A9 | * | 5/2010  | Cannon et al. ............... 455/41.2 |
| 2011/0305337 | A1 | * | 12/2011 | Devol et al. ................... 380/259 |
| 2012/0089920 | A1 |   | 4/2012  | Eick |
| 2013/0254401 | A1 | * | 9/2013  | Marshall et al. ............. 709/226 |

OTHER PUBLICATIONS

IEEE, "IEEE 100 The Authoritative Dictionary of IEEE Standards Terms", Seventh Edition, 2000, 12 pages.*
Ramos et al., "Cloud Computing and the Value of zEnterprise", 2011, 44 Pages.*

(Continued)

*Primary Examiner* — Jeffrey D Popham
(74) *Attorney, Agent, or Firm* — Christopher K. McLane; Andrew M. Calderon; Roberts Mlotkowski Safran Cole & Calderon, P.C.

(57) ABSTRACT

Systems and methods of providing spatial security of data stored on a hard disk drive. A method includes associating a user with at least one track and/or sector of the hard disk drive. The method also includes locking the at least one track and/or sector as a default setting. The method additionally includes determining the user has moved into a predefined area. The method further includes unlocking the at least one track and/or sector based on the determining the user has moved into the predefined area.

16 Claims, 7 Drawing Sheets

(56) References Cited

OTHER PUBLICATIONS

Ramos et al., "Cloud Computing and the Value of zEnterprise", 2011; 44 Pages.
Anonymous, "Method and Apparatus for Tenant Driven Security in Cloud and Traditional Environments", Jul. 22, 2012; 3 pages.
Yang et al., "Spatial Cloud Computing", 2011; 20 Pages.
Mell et al., "The NIST Definition of Cloud Computing", Version 15, Oct. 7, 2009; 2 Pages.

\* cited by examiner

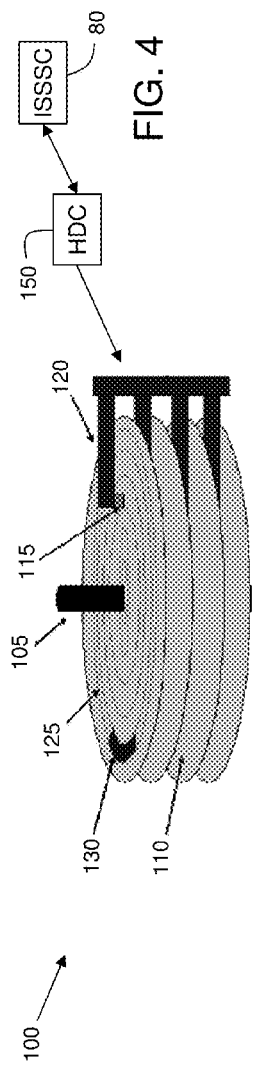
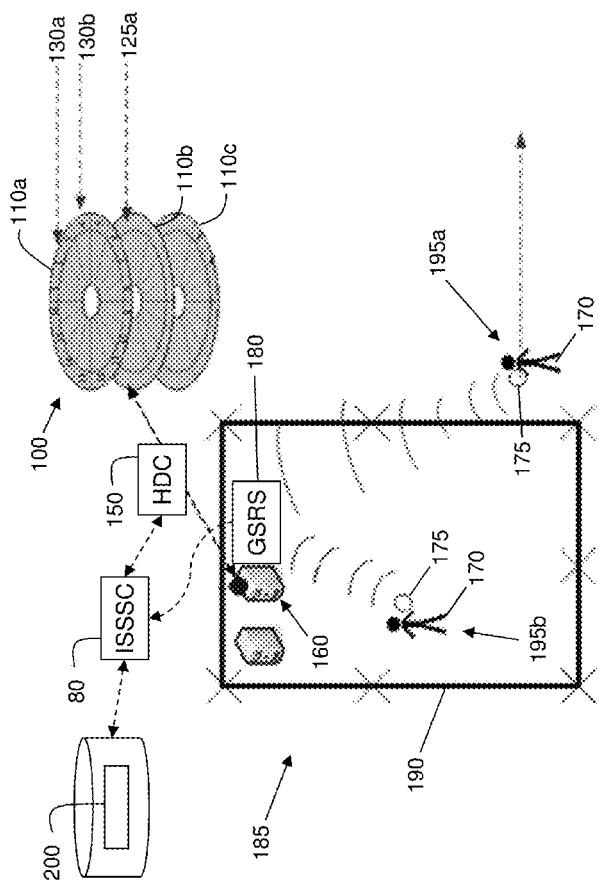
FIG. 4
FIG. 5

SPATIAL SECURITY FOR STORED DATA

FIELD OF THE INVENTION

The present invention generally relates to data storage, and more particularly, to methods and systems for spatial security for stored data.

BACKGROUND

Data security is the practice of keeping data protected from corruption and unauthorized access. The focus behind data security is to ensure privacy while protecting personal or corporate data. Data security has been one of the key areas of focus in the information technology (IT) industry.

Various data security methods include disk encryption, hardware based mechanisms, backups, data masking, and data erasure. Disk Encryption is the practice of encrypting data on a hard disk drive and may be implemented in software or hardware. Hardware based mechanisms, such as physical locks, can physically prevent read and write access to data and hence offer very strong protection against tampering and unauthorized access. Backups are used to ensure data which is lost can be recovered. Data masking of structured data is the process of obscuring (masking) specific data within a database table or cell to ensure that data security is maintained and sensitive information is not exposed to unauthorized personnel. This may include masking the data from users (for example, so banking customer representatives can only see the last four digits of a customer's account number), developers (who need real production data to test new software releases but should not be able to see sensitive financial data), outsourcing vendors, etc. Data erasure is a method of software-based overwriting that completely destroys all electronic data residing on a hard drive or other digital media to ensure that no sensitive data is leaked when the hard drive is retired or reused. Most of the algorithms at storage and retrieval impact the performance of the system since encryption and decryption increase computing overhead.

SUMMARY

In a first aspect of the invention, there is a method of providing spatial security of data stored on a hard disk drive. The method includes associating a user with at least one track and/or sector of the hard disk drive. The method also includes locking the at least one track and/or sector as a default setting. The method additionally includes determining the user has moved into a predefined area. The method further includes unlocking the at least one track and/or sector based on the determining the user has moved into the predefined area.

In another aspect of the invention, there is a system implemented in hardware that includes a geo-spatial reader substrate configured to determine when a geo-spatial coordinate locator moves into or out of a predefined area. The system also includes an intelligent spatial security steward storage controller (ISSSC) configured to at least one of: unlock at least one track and/or sector of a hard disk drive when the geo-spatial coordinate locator moves into the predefined area, and lock the at least one track and/or sector of the hard disk drive when the geo-spatial coordinate locator moves out of the predefined area.

In another aspect of the invention, there is a computer program product for providing spatial security of data stored on a hard disk drive. The computer program product includes one or more computer-readable storage devices. The computer program product also includes program instructions, stored on at least one of the one or more storage devices, to associate a user with a low level portion of the hard disk drive. The computer program product additionally includes program instructions, stored on at least one of the one or more storage devices, to prevent read/write access to the low level portion of the hard disk drive when a user is determined to be outside of a predefined area. The computer program product further includes program instructions, stored on at least one of the one or more storage devices, to permit read/write access to the low level portion of the hard disk drive when a user is determined to be inside the predefined area.

In another aspect of the invention, there is a computer system for providing spatial security of data stored on a hard disk drive. The system includes a CPU, a computer readable memory and a computer readable storage media. The system also includes program instructions to determine when a user moves into or out of a predefined area associated with a computer device connected to the hard disk drive. The system further includes program instructions to unlock at least one track and/or sector of the hard disk drive when the user moves into the predefined area. The system additionally includes program instructions to lock the at least one track and/or sector of the hard disk drive when the user moves out of the predefined area. Each of the program instructions are stored on the computer readable storage media for execution by the CPU via the computer readable memory.

In another aspect of the invention, there is a method of deploying a system for providing spatial security of data stored on a hard disk drive. The method includes providing a computer infrastructure that is adapted to: associate a user with at least one track and/or sector of the hard disk drive; lock the at least one track and/or sector as a default setting; determine the user has moved into a predefined area; and unlock the at least one track and/or sector based on the determining the user has moved into the predefined area. The unlocking permits read/write access to the at least one track and/or sector from a computer device contained in the predefined area. The computer infrastructure that is also adapted to: determine the user has moved out of the predefined area; and lock the at least one track and/or sector based on the determining the user has moved out of the predefined area.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 4 depicts a hard disk drive including tracks and sectors that may be selectively locked and unlocked using spatial security in accordance with aspects of the invention.

FIG. 5 depicts a block diagram of spatial security in accordance with aspects of the invention.

DETAILED DESCRIPTION

Figure 1:
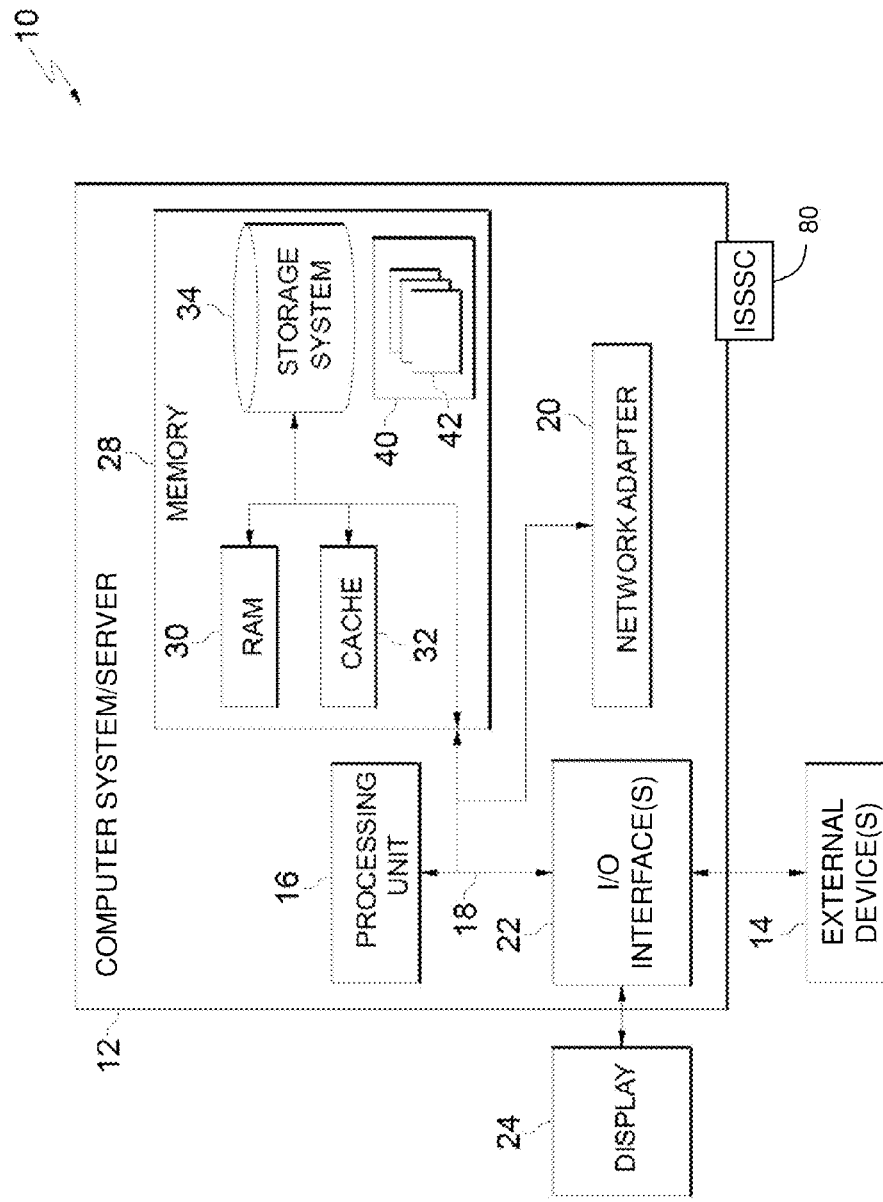
FIG. 1 depicts a hardware configuration according to an embodiment of the present invention.

The present invention generally relates to data storage, and more particularly, to methods and systems for spatial security for stored data. According to aspects of the invention, a spatial security mechanism is implemented at the track and/or sector level of a hard disk that stores data. In embodiments, the location of a user is determined, and certain track(s) and/or sector(s) of a hard disk are unlocked (e.g., made accessible by a disk controller) when the user is determined to be within a predefined area. The certain track(s) and/or sector(s) of the hard disk are locked (e.g., made inaccessible by the disk controller) when the user is determined to be outside the predefined area. The spatial security described herein may be used with a stand-alone machine and/or in a cloud environment. The spatial security described herein may be used as an additional layer on top of one or more other security measures. In this manner, implementations of the invention provide a spatial security mechanism that selectively locks and unlocks regions of a hard disk based on proximity of an authorized user.

In accordance with aspects of the invention, a spatial sensitive security mechanism is implemented at the hard disk track/sector level. This spatial sensitive security mechanism can be overlaid above the other security mechanisms (e.g., password, encryption, etc.). Existing security mechanisms have a significant impact on performance. Moreover, handling sensitive data (e.g., both plain data and media) may require access enabled at specific locations only. While access can be restricted through physical identity including biometric parameters, spatial security as described herein provides another dimension of ensuring privacy.

In embodiments, data on a storage disk cannot be accessed unless a person who possesses a spatial coordinate sensor is within specified coordinates. Implementations may utilize a sector level locking/unlocking mechanism in which sectors are unlocked by default. When a user attempts to access the storage disk, the user location is analyzed to determine whether the user is within a predefined spatial proximity to the storage disk. When the user is determined to be within the predefined spatial proximity, respective sectors associated with the user are unlocked for the user to access the data. Sectors remain unlocked as long as user is within the predefined spatial proximity. Implementations of the invention thus provide storage device protection in a multi-user environment where the storage device is accessed by multiple users and access is authorized only when a particular user is sufficiently close to the storage device. Implementations of the invention also provide low level protection at the sector level where regions of the storage device can be locked/unlocked based on a determined spatial proximity of an authorized user to the storage device.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16 (e.g., CPU). In embodiments, computer system/server 12 includes or communicates with an Intelligent Spatial Security Steward Storage Controller (ISSSC) 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of ISSSC 80 may be implemented as one or more program modules 42. Additionally, ISSSC 80 may be implemented as separate dedicated processors or a single or several processors to provide the functionality described herein. In embodiments, ISSSC 80 performs one or more of the processes described herein in any contemplated combination, including but not limited to: associate at least one track and/or sector of a hard disk drive with a user; determine a location of the user; and/or selectively lock and unlock the at least one track and/or sector of a hard disk drive based on the determined location of the user.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
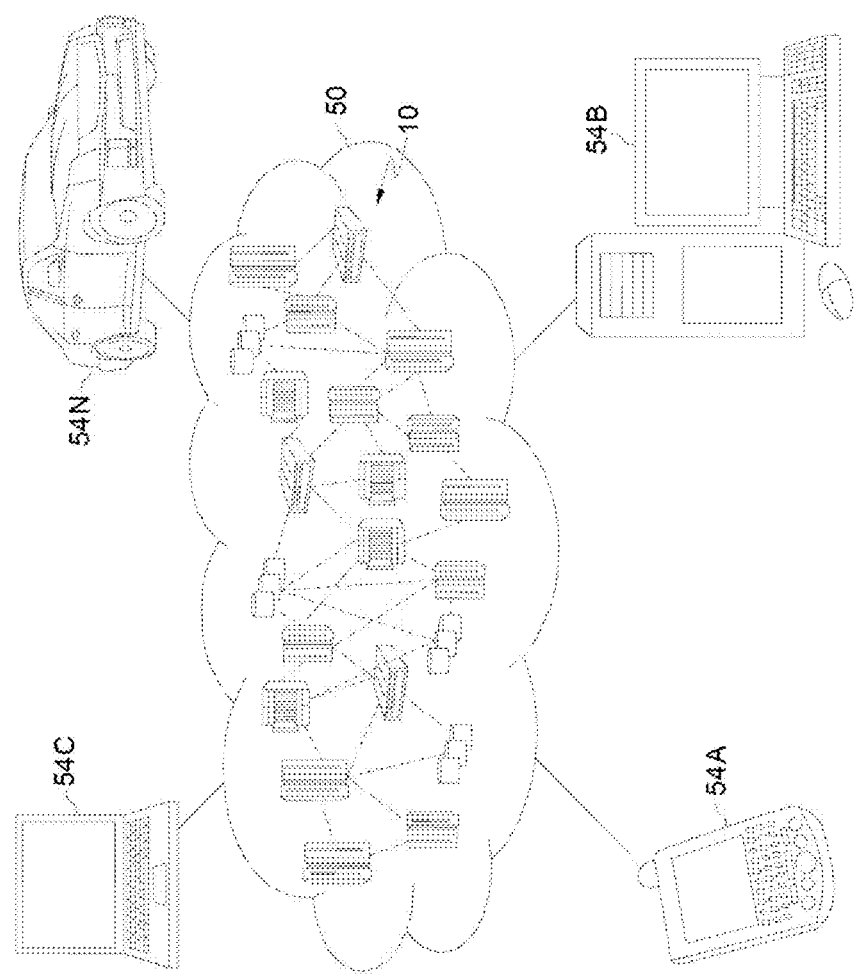
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
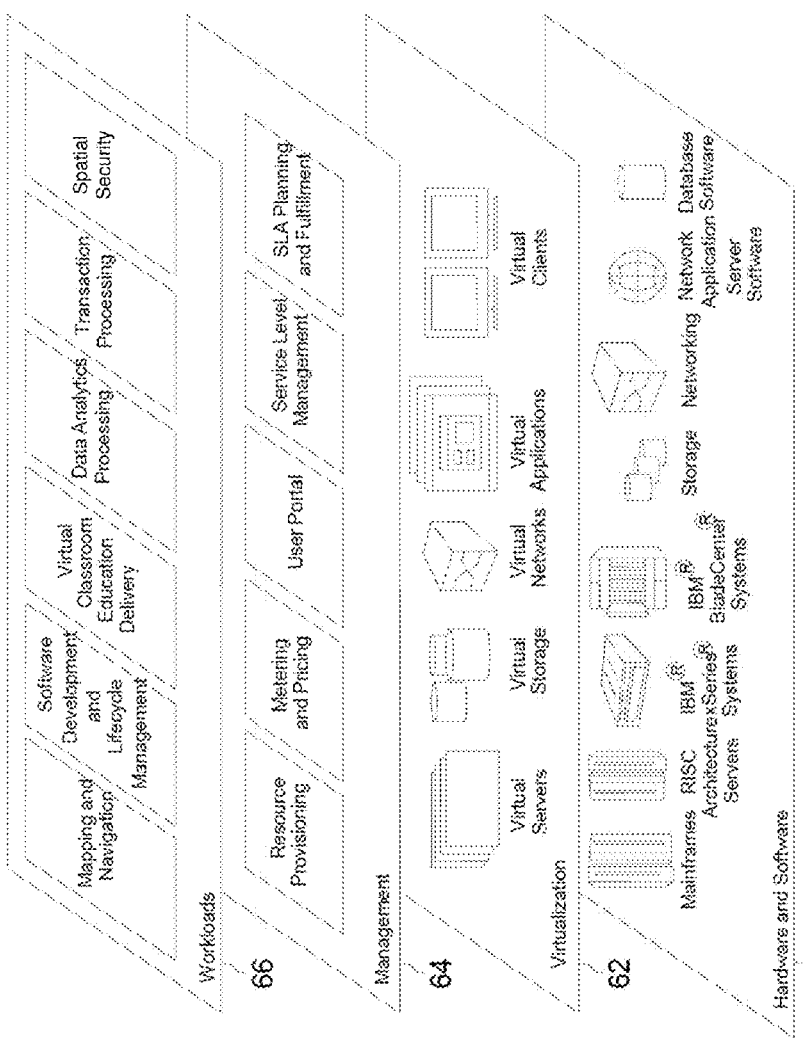
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and spatial security. In accordance with aspects of the invention, the spatial security workload/function operates to perform one or more of the processes of ISSSC 80 described herein, including but not limited to: associate at least one track and/or sector of a hard disk drive with a user; determine a location of the user; and/or selectively lock and unlock the at least one track and/or sector of a hard disk drive based on the determined location of the user.

As will be appreciated by one skilled in the art, aspects of the present invention, including ISSSC 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this description, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Block Diagrams and Exemplary Operation

FIG. 4 depicts a hard disk drive (HDD) 100 having tracks and sectors that may be selectively locked and unlocked using spatial security in accordance with aspects of the invention. HDD 100 records data by magnetizing a thin film of ferromagnetic material on a disk. HDD 100 may include disk spindle 105 that holds flat circular disks or disk platters 110, which hold the recorded data. Information is written to and read from disk platter 110 as disk platter 110 rotates using read-and-write heads 115 that operate very close over the magnetic surface. An actuator arm (or access arm) 120 moves head 115 on an arc (e.g., radially) across disk platter 110 as disk platter 110 spins, allowing each head 115 to access the surface of disk platter 110 as it spins. Each disk platter 110 contains tracks 125 that are arranged as concentric circles on the surface of disk platter 110. Tracks 125 are numbered, starting from zero, starting at the outside of disk platter 110, as one example. A sector 130 is a subdivision of a respective track 125 on a magnetic disk or optical disc. Each sector 130 stores a fixed amount of data. Data storage capacity (e.g., size) of sector 130 may be, but is not limited to, 512 bytes or 2048 bytes.

Still referring to FIG. 4, a hard disk controller (HDC) 150 enables a computer to read and write information to HDD 100. HDC 150 may be integrated with HDD 100, or may be a separate device from HDD 100. According to aspects of the invention, ISSSC 80 instructs with HDC 150 to selectively lock and unlock certain ones of tracks 125 and/or sectors 130 of HDD 100 based on a determined location of a user. As used herein, locking a track/sector refers to HDC 150 controlling HDD 100 to prevent write and/or read access to the track/sector, and unlocking a track/sector refers to HDC 150 controlling HDD 100 to permit write and/or read access to the track/sector. By implementing spatial security at the track and/or sector level, embodiments of the invention may be used to selectively lock some track(s)/sectors(s) of HDD 100 (e.g., for secure data), while leaving other track(s)/sectors(s) of HDD 100 unlocked at all times (e.g., for non-secure data).

FIG. 5 depicts a block diagram of spatial security in local environment accordance with aspects of the invention. In embodiments, computer device 160 has read and/or write access to HDD 100 via HDC 150. In the environment depicted in FIG. 5, HDD 100 is local to the computer device 160, e.g., HDD 100 is included in computer device 160 or accessed by computer device 160 via a local area network (LAN), intranet, etc. According to aspects of the invention, ISSSC 80 instructs HDC 150 to selectively lock and unlock predefined tracks/sectors of HDD 100 based on a location of a user 170 relative to computer device 160.

In embodiments, user 170 is provided with a geo-spatial coordinate locator (GCL) 175 that is used to determine the location of user 170 relative to computer device 160. GCL 175 may be any suitable device configured for determining a location of an object, including but not limited to, Radio-Frequency Identification (RFID) tag, Global Positioning System (GPS) transmitter, Bluetooth transmitter, Near Field Communication (NFC) tag, etc. In one non-limiting example, GCL 175 may include an RFID tag or NFC tag embedded in a badge, button, article of clothing, or the like possessed by user 170. In another non-limiting example, GCL 175 may include a mobile computing device (e.g., smart phone, etc.) carried by user 170 and having a GPS and/or Bluetooth transmitter.

Still referring to FIG. 5, aspects of the invention utilize a geo-spatial reader substrate (GSRS) 180 that operates to determine a location of user 170 via GCL 175. GSRS 180 may be any suitable device configured to detect GCL 175. In one non-limiting example, when GCL 175 is an RFID tag, GSRS 180 may include one or more RFID readers that detect when the RFID tag crosses a boundary (e.g., a receiving trap). In another non-limiting example, when GCL 175 includes a mobile computing device having a GPS transmitter, GSRS 180 may include a computing device that periodically polls GCL 175 to determine a GPS location of GCL 175. In a further non-limiting example, when GCL 175 includes a mobile computing device having a Bluetooth transmitter, GSRS 180 may include a computing device having Bluetooth receiver that detects when GCL 175 is discoverable, e.g., comes within a predefined distance of GSRS 180. In yet another non-limiting example, when GCL 175 includes an NFC tag, GSRS 180 may include an NFC receiver embedded in computer device 160.

According to aspects of the invention, GSRS 180 is configured to determine when GCL 175 (and by association user 170) comes within a predefined area 185, which may be defined by a boundary 190. In embodiments, boundary 190 may be defined by placement of one or more RFID readers around computer device 160 (e.g., as depicted at locations "X" in FIG. 5), GPS coordinates around computer device 160, Bluetooth transmission range around computer device 160, etc. In this manner, GSRS 180 may be used to determine that user 170 is outside of area 185 at location 195*a*, and that user 170 is inside area 185 at location 195*b*.

With continued reference to FIG. 5, GSRS 180 may determine whether user 170 is inside or outside of area 185 and communicate the result of this determination to ISSSC 80. Alternatively, GSRS 180 may determine a location of user 170, transmit the location to ISSSC 80, and ISSSC 80 may determine whether user is inside or outside area 185 by comparing the determined location to data defining boundary 190. In either embodiment, when user 170 is determined to be inside area 185, ISSSC 80 instructs HDC 150 to unlock at least one predefined track/sector of HDD 100 associated with user 170. On the other hand, when user 170 is determined to not be inside area 185, ISSSC 80 instructs HDC 150 to lock the at least one predefined track/sector of HDD 100 associated with user 170. In this manner, the at least one predefined track/sector of HDD 100 associated with user 170 is only unlocked when user 170 is determined to be within a predefined area 185 relative to computer device 160.

According to aspects of the invention, the association of user 170 with at least one predefined track/sector of HDD 100 may be defined in data structure 200 that is stored in or accessible by ISSSC 80 (e.g., in storage system 34 as described in FIG. 1, or the like). In embodiments, GCL 175 of user 170 has a unique identifier that is detected by GSRS 180 and communicated to ISSSC 80. The unique identifier may be stored in data structure 200 (e.g., database, lookup table, etc.) in association with a pointer to at least one predefined track/sector of HDD 100. As such, when GSRS 180 communicates the unique identifier to ISSSC 80 along with an indication that GCL 175 is inside area 185, ISSSC 80 compares the unique identifier to data structure 200 to determine which track/sector of HDD 100 is to be unlocked for this user 170.

Still referring to FIG. 5, the at least one predefined track/sector of HDD 100 associated with user 170 may be any desired portion of HDD 100, e.g., as defined in data structure 200 by site administrator, security administrator, etc. In the non-limiting example depicted in FIG. 5, data structure 200 indicates that sectors 130*a*, 130*b* and track 125*a* are associated with user 170. Accordingly, ISSSC 80 causes HDC 150 to unlock sectors 130*a*, 130*b* and track 125*a* when GCL 175 is inside area 185, and causes HDC 150 to lock sectors 130*a*, 130*b* and track 125*a* when GCL 175 is not inside area 185. In this example, other tracks and sectors on disk platters 110*a-c* (e.g., other than sectors 130*a*, 130*b* and track 125*a*) may remain unlocked at all times, such that these other tracks and sectors are accessible by any user at any time via computer device 160 without regard to location of user 170. Further, other tracks and sectors may be associated with plural different users and selectively locked and unlocked based on the determined location of each respective user.

According to aspects of the invention, ISSSC 80 is configured to cause HDC 150 to lock (e.g., disable) the at least one predefined track/sector of HDD 100 associated with user 170 as a default setting. In this manner, the at least one predefined track/sector of HDD 100 is always locked until such a time as GSRS 180 detects that GCL 175 has moved to within area 185. In implementations, computer device 160 may be provided with additional security measures that user 170 must satisfy before accessing the at least one predefined track/sector of HDD 100, even when ISSSC 80 has instructed HDC 150 to unlock the at least one predefined track/sector. For example, in order to access the at least one predefined track/sector HDD 100, user 170 may be required to enter a password, provide a decryption key, etc., in addition to being detected within area 185. In additional implementations, ISSSC 80 triggers an alarm and/or locks security doors when a person attempts to access the at least one predefined track/sector HDD 100 using computer device 160 when user 170 is not inside area 185.

Figure 6:
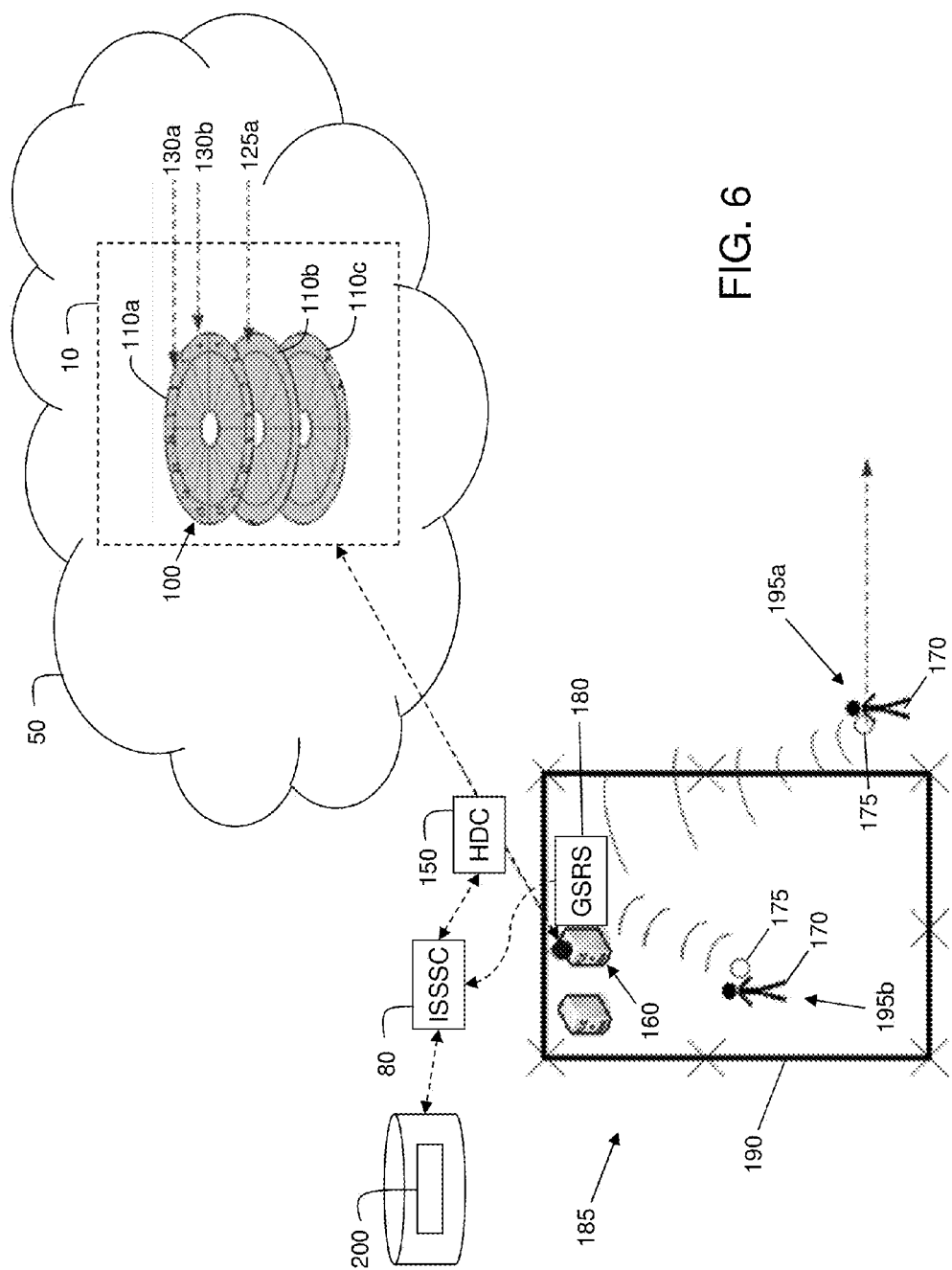
FIG. 6 depicts a block diagram of spatial security in a cloud environment in accordance with aspects of the invention.

FIG. 6 depicts a block diagram of spatial security in a cloud environment in accordance with aspects of the invention. In the environment depicted in FIG. 6, HDD 100 is located at a node 10 in a storage cloud 50, and computer device 160 represents one of computing devices 54A-N shown in FIG. 2. ISSSC 80 may be located locally at computer device 160, or may be located remotely at a node in cloud 50. GSRS 180 may communicate with ISSSC 80 via wide area network (WAN), Internet, etc., when ISSSC 80 is located remotely at a node in cloud 50. Similarly, computer device 160 may communicate with HDD 100 via WAN, Internet, etc. In a manner similar to that described with respect to FIG. 5, ISSSC 80, GCL 175, and GSRS 180 may be used to selectively lock and unlock tracks/sectors of HDD 100 residing remotely in cloud 50 based on a determined location of user 170 in relation to area 185 associated with local computer device 160.

Flow Diagrams

Figure 7:
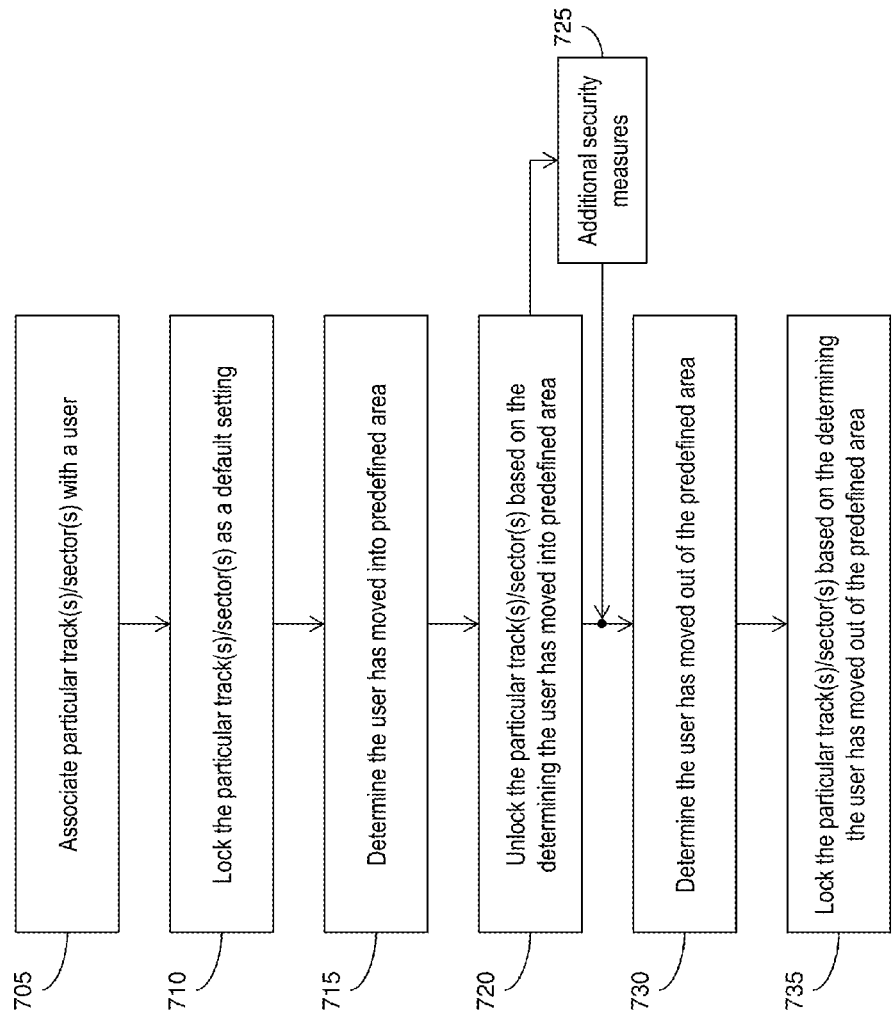
FIGS. 7 and 8 show exemplary flows in accordance with aspects of the invention.
Figure 8:
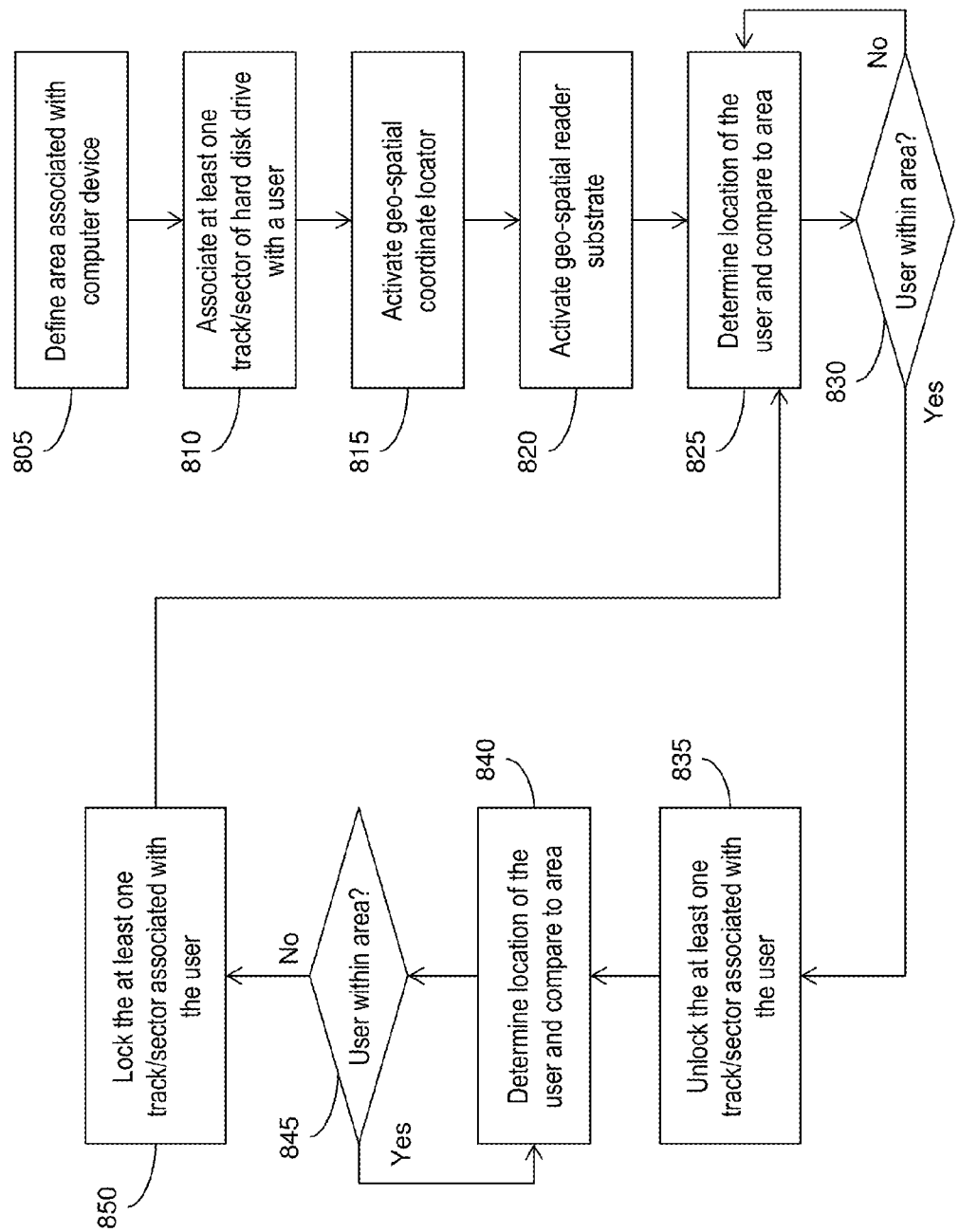

FIGS. 7 and 8 show exemplary flows for performing aspects of the present invention. The steps of FIGS. 7 and 8 may be implemented in any of the environments of FIGS. 1-6, for example.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in any one or more of the environments of FIGS. 1-6.

FIG. 7 depicts an exemplary flow for a process in accordance with aspects of the present invention. At step 705, the system associates particular track(s)/sector(s) of a hard disk drive (e.g., HDD 100) with a user (e.g., user 170). In embodiments, step 705 involves associating a unique identifier of a geo-spatial coordinate locator (e.g., GCL 175) of a user with pointers to the particular track(s)/sector(s) in a data structure (e.g., data structure 200).

At step 710, the system locks the particular track(s)/sector(s) as a default setting. In embodiments, an Intelligent Spatial Security Steward Storage Controller (e.g., ISSSC 80) causes a hard disk controller (e.g., HDC 150) to lock the particular track(s)/sector(s) as a default setting.

At step 715, the system determines that the user has moved into a predefined area (e.g., area 185). In embodiments, a geo-spatial reader substrate (e.g., GSRS 180) detects that the GCL carried by the user crosses a boundary (e.g., boundary 190) surrounding a computer device (e.g., computer device 160) or that the GCL carried by the user comes within a predefined distance of the computer device, e.g., in a manner similar to that described with respect to FIGS. 5 and 6. In other embodiments, the GSRS determines location coordinates of the GCL, transmits the coordinates to the ISSSC, and the ISSSC determines that the GCL crossed the boundary or came within the predefined distance of the computer device.

At step 720, the system unlocks the particular track(s)/sector(s) based on the determining that the user has moved into the predefined area. In embodiments, the ISSSC instructs the HDC to unlock the particular track(s)/sector(s) based on the determining that the user has moved into the predefined area. The unlocking at step 720 makes it so that a person can access the particular track(s)/sector(s) using the computer device (e.g., computer device 160). Optional step 725 includes the system prompting the user for one or more additional security measures (e.g., password, decryption key, etc.) before permitting access to the particular track(s)/sector(s) via the computer device.

At step 730, the system determines that the user has moved out of the predefined area (e.g., area 185). This may be performed in a manner similar to step 715, e.g., by the GSRS detecting the location of the GCL relative to the boundary.

At step 735, the system locks the particular track(s)/sector(s) based on the determining that the user has moved out of the predefined area. In embodiments, the ISSSC instructs the HDC to lock the particular track(s)/sector(s) based on the determining that the user has moved out of the predefined area. The locking at step 735 makes it so that no person can access the particular track(s)/sector(s) using the computer device (e.g., computer device 160).

FIG. 8 depicts an exemplary flow for a process in accordance with aspects of the present invention. At step 805, a predefined area (e.g., area 185) is defined in association with a computer device (e.g., computer device 160) for accessing a hard disk drive (e.g., HDD 100). In embodiments, the area may be defined using a boundary (e.g., boundary 190) defined by GPS coordinates, RFID/NFC reader location(s), Bluetooth receiver location, etc.

At step 810, at least one track and/or sector of the HDD is associated with a user in a data structure (e.g., data structure 200). In embodiments, a pointer to the at least one track and/or sector of the HDD is input into the data structure. In embodiments, a unique identifier of a GCL (e.g., GCL 175) of a user (e.g., user 170) is also input into the data structure and associated with the least one track and/or sector. Step 810 may be performed manually (e.g., input by an administrator) or automatically (e.g., using a specially programmed computing device).

At step 815, the GCL is activated, e.g., turned on to transmit a signal in the case of a GPS and/or Bluetooth transmitter. At step 820, a GSRS (e.g., GSRS 180) is activated, e.g., turned on to detect an RFID/NFC tag, to detect a Bluetooth signal, to poll a device for GPS coordinates, etc.

At step 825, the GSRS determines a location (e.g., coordinates) of the user and communicates the determined location to the ISSSC (e.g., ISSSC 80), e.g., as described with respect to FIG. 5. At step 830, the ISSSC compares the determined location (from step 825) to the boundary, and determines whether the user is inside or outside the location, e.g., as described with respect to FIG. 5. Alternatively, the GSRS may determine when the user is inside or outside the area at step 825, and the GSRS may inform the ISSSC that the user is inside or outside the area at step 830. When the user is determined to be outside the area, the system loops back to step 825. In this manner, no track(s)/sectors(s) are changed from a locked state to an unlocked state since the user has not been detected within the area.

On the other hand, when the user is determined to be inside the area, then at step 835 the ISSSC determines which track(s)/sectors(s) are associated with this user and causes the hard disk controller (e.g., HDC 150) to unlock those track(s)/sectors(s), e.g., as described with respect to FIG. 5. The unlocking at step 835 permits a person to access the track(s)/sectors(s) via the computer device. After unlocking the track(s)/sectors(s) at step 835, the system continues to determine the location of the user at step 840 and compare the detected location to the boundary at step 845, i.e., to determine whether the user remains inside the area or moves out of the area. The track(s)/sector(s) remain unlocked as long as the user stays within the area. However, when the user moves out of the area, at step 850 the ISSSC causes the HDC to lock the track(s)/sectors(s) are associated with this user, e.g., as described with respect to FIG. 5.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of providing spatial security of data stored on a hard disk drive, comprising:
enabling access by a user to a computer device including a hard disk drive having at least one predefined secure track and/or sector, and at least one predefined unlocked track and/or sector, wherein the at least one predefined secure track and/or sector is locked as a default setting to prevent read/write access of all users and the at least one predefined unlocked track and/or sector is unlocked to permit read/write access of all users at any time;
associating, in a data structure, a unique identifier of the user with a pointer to the at least one predefined secure track and/or sector of the hard disk drive to indicate that the user has permission to access the at least one predefined secure track and/or sector, wherein the at least one predefined secure track and/or sector is defined by an administrator in the data structure, the at least one predefined secure track is arranged as a concentric circle on a surface of a disk platter, and the at least one predefined secure sector is a subdivision of the at least one predefined track on a magnetic or optical disc;
determining the user has moved into a predefined area, wherein the predefined area is defined as a boundary with a predefined distance around the computer device that contains the hard disk drive;
based upon and after determining the user has moved into the predefined area, comparing the unique identifier of the user to the data structure to determine that the user has permission to access the at least one predefined secure track and/or sector;
based upon and after determining that the user has permission, unlocking only the at least one predefined secure track and/or sector such that the user may access the at least one predefined secure track and/or sector using the computer device when the computer device is inside of the boundary and the user is inside of the boundary;
determining that the user has moved out of the predefined area;
re-locking the at least one predefined secure track and/or sector based on the determining that the user has moved out of the predefined area so that the user can access the predefined unlocked track and/or sector at any time without regard to a location of the user but can only access the predefined secure track and/or sector when the user is inside of the boundary of the predefined area, and
generating an alert and locking security doors to secure the predefined area when the user attempts to access the at least one predefined secure track and/or sector while the at least one track and/or sector is locked and the user is outside of the boundary of the predefined area.

2. The method of claim 1, wherein the locking comprises causing a hard disk controller to prevent read/write access to the at least one predefined secure track and/or sector.

3. The method of claim 1, wherein the unlocking comprises causing a hard disk controller to permit read/write access to the at least one predefined secure track and/or sector.

4. The method of claim 1, further comprising prompting the user to provide at least one additional security measure after the unlocking before permitting the user to access the unlocked at least one predefined secure track and/or sector.

5. The method of claim 4, wherein the at least one additional security measure comprises at least one of a password and a decryption key.

6. The method of claim 1, wherein the determining the user has moved into the predefined area comprises detecting that a geo-spatial coordinate locator associated with the user has crossed a boundary of the predefined area.

7. The method of claim 1, wherein the determining the user has moved into the predefined area comprises:
determining coordinates of a geo-spatial coordinate locator associated with the user; and
comparing the determined coordinates to coordinates of a boundary of the predefined area.

8. The method of claim 1, wherein the determining the user has moved into the predefined area comprises detecting that a geo-spatial coordinate locator associated with the user is within a predefined distance from the computer device that is connected to the hard disk drive.

9. The method of claim 1, further comprising:
associating, in the data structure, a unique identifier of a second user with a pointer to the at least one predefined secure track and/or sector of the hard disk drive to indicate that the second user has permission to access the at least one predefined secure track and/or sector; and
locking the at least one predefined secure track and/or sector when the computer device is inside the boundary and both the user and the second user are outside of the boundary.

10. A system implemented in hardware, comprising:
a hard disk drive located at a node in a storage cloud, the hard disk drive including at least one predefined secure track and/or sector locked as a default setting to prevent read/write access;
a user accessible computer device remote from the hard disk drive and in communication with the hard disk drive;
a geo-spatial reader substrate configured to determine when a geo-spatial coordinate locator of a user moves into or out of a predefined area which is a boundary with a predefined distance around the computer device;
an intelligent spatial security steward storage controller (ISSSC) configured to:
access the at least one predefined secure track and/or sector, wherein the at least one predefined secure track and/or sector is associated with a unique identifier of the user and defined by an administrator in a data structure, the at least one predefined secure track being arranged as a concentric circle on a surface of a disk platter and the at least one predefined sector being a subdivision of the at least one predefined secure track on a magnetic or optical disc;
compare the unique identifier of the user to the data structure to determine that the user has permission to access the at least one predefined secure track and/or sector;
unlock only the at least one predefined secure track and/or sector such that the user may access the at least one predefined secure track and/or sector using the computer device upon determining by the geo-spatial reader that the computer device is inside of the predefined area and the user is inside of the predefined area and upon determining that the user has permission to access the at least one predefined secure track and or sector;
prompt the user to provide at least one additional security measure after the unlocking of the at least one predefined secure track and/or sector before permitting the user to access the unlocked at least one predefined secure track and/or sector;

lock the at least one predefined secure track and/or sector upon determining by the geo-spatial reader that the computer device is inside the predefined area and the user is outside of the predefined area, wherein predefined unsecured tracks and/or sectors of the hard disk drive are accessible using the computer device at any time by the user without regard to a location of the user while the at least one predefined secure track and/or sector is locked because the user is outside of the predefined area; and generate an alert and lock security doors to secure the predefined area when the user attempts to access the at least one predefined secure track and/or sector while the at least one track and/or sector is locked and the user is outside of the boundary of the predefined area.

11. The system of claim 10, wherein the geo-spatial reader substrate determines when a geo-spatial coordinate locator moves into or out of the predefined area using at least one of: radio-frequency identification, global positioning system coordinates, and near field communication.

12. The system of claim 10, wherein:
the predefined area is associated with a computer device connected to the hard disk drive;
the computer device provides access to the at least one predefined secure track and/or sector of the hard disk drive when the at least one predefined secure track and/or sector of the hard disk drive is unlocked;
the computer device is within the predefined area; and
the computer device is separate from the geo-spatial coordinate locator.

13. The system of claim 10, wherein the ISSSC is further configured to:
unlock only the at least one predefined secure track and/or sector such that the user or a second user may access the at least one predefined secure track and/or sector using the computer device upon determining by the geo-spatial reader that the computer device is inside of the predefined area and the user or the second user is inside of the predefined area; and lock the at least one predefined secure track and/or sector only upon determining by the geo-spatial reader that the computer device is inside the predefined area and both the first user and the second user are outside of the predefined area, wherein the predefined unsecured tracks and/or sectors of the hard disk drive are accessible using the computer device while the at least one predefined secure track and/or sector is locked, and wherein the at least one predefined secure track and/or sector is associated with a unique identifier of the user and a unique identifier of the second user.

14. A computer program product for providing spatial security of data stored on a hard disk drive, the computer program product comprising:
one or more computer-readable storage devices;
program instructions, stored on at least one of the one or more storage devices, to associate a unique identifier of a user with at least one predefined secure track and/or sector of the hard disk drive, wherein the at least one predefined secure track and/or sector is defined by an administrator in a data structure, the at least one predefined secure track is arranged as a concentric circle on a surface of a disk platter, and the at least one predefined secure sector is a subdivision of the at least one predefined track on a magnetic or optical disc;

program instructions, stored on at least one of the one or more storage devices, to prevent read/write access to the at least one predefined secure track and/or sector of the hard disk drive when the user is determined to be outside of a predefined area, wherein predefined unsecure tracks and/or sectors of the hard disk drive are accessible to the user when the user is determined to be outside of the predefined area and while access is prevented to the at least one predefined secure track and/or sector;

program instructions, stored on at least one of the one or more storage devices, to permit read/write access to the at least one predefined secure track and/or sector of the hard disk drive when the user is determined to be inside the predefined area;

program instructions, stored on the at least one of the one or more storage devices, to determine that a geo-spatial coordinate locator associated with the user moves within the predefined area, the predefined area being the boundary with a predefined distance around the computer device that contains the hard disk drive with the at least one predefined secure track and/or sector;

program instructions to unlock only the at least one predefined secure track and/or sector such that the user may access the at least one predefined secure track and/or sector using the computer device when the computer device is inside of the boundary and the user is inside of the boundary and lock the at least one predefined secure track and/or sector when the computer device is inside the boundary and the user is outside of the boundary, program instructions to determine that the user has moved out of the predefined area;

program instructions to re-lock the at least one predefined secure track and/or sector based on the determining that the user has moved out of the predefined area so that the user can access the predefined unlocked track and/or sector at any time without regard to a location of the user but can only access the predefined secure track and/or sector when the user is inside of the boundary of the predefined area; and program instructions to lock security doors to secure the predefined area when the user attempts to access the at least one predefined secure track and/or sector while the at least one track and/or sector is locked and the user is outside of the boundary of the predefined area.

15. The computer program product of claim 14, wherein:
the preventing read/write access comprises causing a hard disk controller to prevent read/write access from a computing device associated with the predefined area; and
the permitting read/write access comprises causing the hard disk controller to permit read/write access from the computing device associated with the predefined area.

16. A computer system for providing spatial security of data stored on a hard disk drive, the system comprising:
one or more computer processors;
one or more computer readable hardware storage devices;
program instructions stored on the one or more computer readable hardware storage devices for execution by the one or more computer processors, the program instructions comprising:
program instructions to associate a unique identifier of a user with a plurality of predefined secure tracks and/or sectors of the hard disk drive, wherein the unique identifier is defined by an administrator in a data structure, the plurality of predefined secure tracks being arranged as a concentric circle on a surface of a disk platter and the plurality of predefined secure sectors being subdivisions of the plurality of predefined secure tracks on a magnetic or optical disc;

program instructions to determine when a user moves into or out of a predefined area associated with a computer device connected to the hard disk drive;

program instructions to unlock only the plurality of predefined secure tracks and/or sectors of the hard disk drive upon determining that the user moves into the predefined area;

program instructions to lock the plurality of predefined secure tracks and/or sectors when the user moves out of the predefined area, wherein predefined unsecure tracks and/or sectors of the hard disk drive are accessible at any time by the user without regard to the location of the unsecure tracks and/or sectors using the computer device while the plurality of predefined secure tracks and/or sectors are locked because the user is outside of the predefined area; and program instruction to generate an alarm and lock security doors to secure the predefined area when the user attempts to access the at least one predefined secure track and/or sector while the at least one track and/or sector is locked and the user is outside of the boundary of the predefined area, wherein the determining when the user moves into or out of the predefined area comprises detecting that a Radio-Frequency Identification (RFID) tag possessed by the user crosses a boundary of the predefined area, and the predefined area is the boundary with a predefined distance around the computer device that contains the hard disk drive with the at least one predefined track and/or sector.

* * * * *